Dec. 5, 1967

J. C. STEFFEN 3,355,749

COMBINED TUBE CUTTING AND CLEANING DEVICE

Filed May 17, 1965

INVENTOR.
JAMES C. STEFFEN

BY John M. Nolan

ATTORNEY

United States Patent Office 3,355,749
Patented Dec. 5, 196[?]

3,355,749
COMBINED TUBE CUTTING AND CLEANING DEVICE
James C. Steffen, Scott County, Iowa
(R.R. 3, Davenport, Iowa 52804)
Filed May 17, 1965, Ser. No. 456,118
8 Claims. (Cl. 7—14.1)

This invention relates to a manually operated tool and more particularly to a device for simultaneously cutting tubing and cleaning its outer surface.

Copper or brass tubing is now generally utilized in most plumbing installations. The tubing is conventionally joined to various fittings by means of soldered joints, the fittings having end cups for tightly receiving the ends of the tubing, the solder adhering to and joining the outer periphery of the tubing and the interior surface of the end cups. For proper adherence of the solder to the tubing, the outer surface of the end portion of the tubing must be clean.

Thus, to make a proper soldered joint, the tubing must first be cut to the desired length, the end of the tubing must be cleaned, and a soldering flux must generally be applied to the cleaned surface. Heretofore, the cutting and cleaning of the tubing has been accomplished in successive steps with separate tools, increasing the time necessary to make a joint and consequently increasing the cost of the installation.

According to the present invention, a tool is provided for simultaneously cutting the tubing and cleaning the exterior surface of the tubing on both sides of the cut.

Another object of the invention is to provide an abrasive member, such as emery cloth or the like, for abrading the surface of the tubing to effectively clean said surface, and further to provide a novel means for advancing the abrasive member after a particular area of the member is used to utilize a new area of the member.

Another object is to provide such a tool with a reaming device for removing burrs from the interior edge of the tubing end, and also to provide such a reaming device which will accommodate various diameters of tubing.

Another object is to provide such a tool with means for applying flux to the cleaned end of the tubing while the reaming device is being used, and further to mount the reaming device on the tool for movement relative to the flux applicator to apply flux to tubing of various wall thicknesses or to selectively omit the application of the flux.

Still another object is to provide such a tool of simple, rugged, and compact construction, inexpensive to manufacture and simple to operate.

These and other objects will become apparent from the following detailed description and accompanying drawing wherein.

Figure 1:
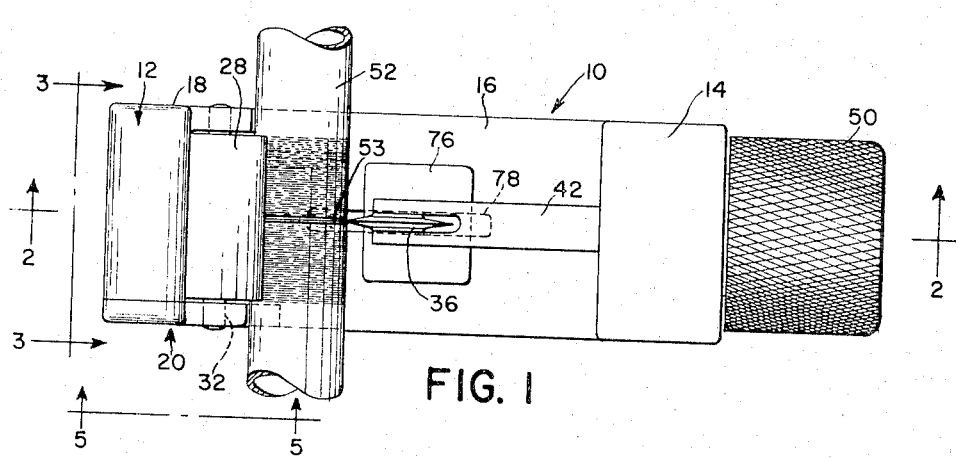
FIG. 1 is a plan view of the device operating on a section of tubing.

The combined cutting and cleaning device includes a generally U-shaped frame 10 having opposite leg portions 12 and 14 and a bight portion 16. The leg portion 12 is substantially hollow and includes opposite side plates 18 and 20, the side plate 20 being formed by upper and lower members 22 and 24 attached to the frame 10 by a plurality of fasteners 26.

A pair of cylindrical, axially parallel cradling members or rolls 28 and 30 are respectively mounted on axial shafts 32 and 34, journaled at opposite ends in the side plate 18 and 20.

A cutting wheel 36 is rotatably carried on a shaft 3[?] mounted on the leg portion 14 via a mounting means indicated generally by the numeral 40, the cutting wheel 36 being opposite and axially parallel to the cradling roll 28 and 30.

The mounting means 40 includes a rod 42 axially slidable in a transverse bore 44 through the leg portion 14 and having an axial threaded bore 46. A threaded shaf[t] 48 is threadable in the bore 46 and coaxially affixed to an end cap 50 which is rotatably mounted on the leg portion 14. Rotation of the end cap 50 rotates the shaft 48 in the bore 46 to axially slide the rod 42 in the bore 44, moving the cutting wheel 36, carried by the rod, toward or away from the cradling rolls to releasably clamp an axially parallel section of tubing 52.

When a section of tubing is thus clamped, relative rotation of frame 10 and the tubing 52 about the tubing axis moves the cutting wheel 36 around the periphery of the tubing, making a radial cut 53 around the tubing. After one cut is made, the cutting wheel is moved in increments toward the cradling rolls 28 and 30, whereby successive turns of frame 10 relative to the tubing deepens the cut around the tubing until the tubing is severed.

An elongated, flexible abrasive member 54, such as an elongated emery cloth or the like, having an abrasive surface 56 on at least one side, is trained around the cradling roll 30 between the roll and the tubing 52, the abrasive surface 56 engaging the tubing on both sides of the cut 53. The frame 10 forms a storage cavity 58 under the lower side plate 24 for holding a supply of the abrasive member.

Figure 2:
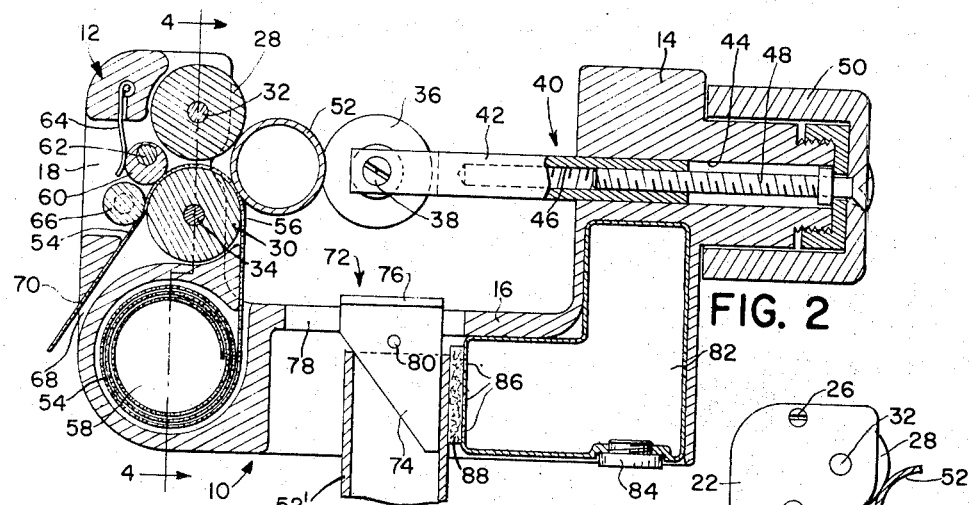
FIG. 2 is a central section view along the line 2—2 of FIG. 1.
Figures 3, 4, 5:
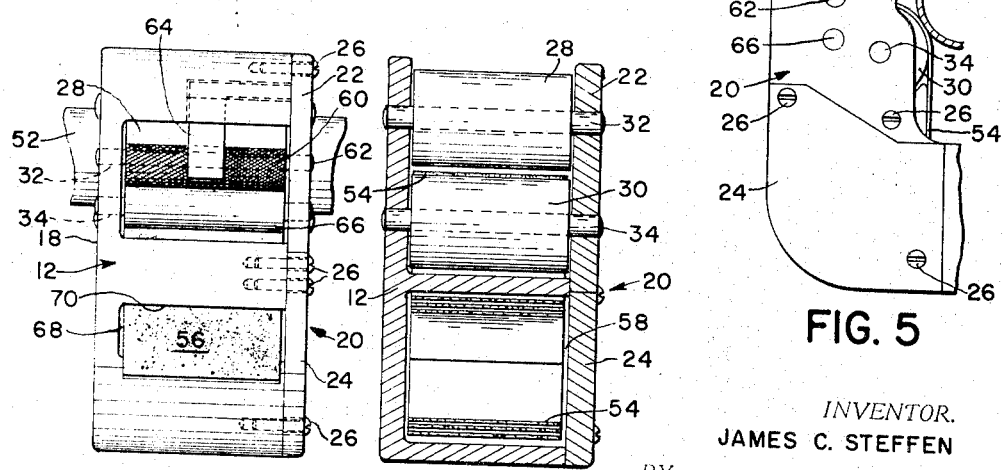
FIG. 3 is an end view of the device as viewed along the line 3—3 of FIG. 1.
FIG. 4 is a section view along the line 4—4 of FIG. 2.
FIG. 5 is a partial elevation view as viewed along the line 5—5 of FIG. 1.

A knurled cylinder 60, axially parallel and adjacent to the roll 30 and eccentrically mounted on a shaft 62 journaled at opposite ends in the sides 18 and 20, forms a locking means for releasably locking the abrasive member 54 to the roll 30. The abrasive member passes between the roll 30 and the cylinder 60 which is spaced from the roll 30 a lesser distance than its largest radius, the cylinder being biased against the abrasive member by a spring means 64 mounted on the frame 10. A longitudinal force on the abrasive member 54, tending to move the abrasive member clockwise (FIG. 2) about the roll axis 34, also tends to move the cylinder 60 in a counterclockwise direction, decreasing the space between the roll 30 and the cylinder 60 and preventing movement of the abrasive member in that direction. Conversely, longitudinal movement of the abrasive member 54 in the opposite direction rotates the cylinder 60 in a clockwise direction against the bias of the spring means 54 to increase the gap between the roll 30 and the cylinder 60, unlocking the abrasive member. Thus, in normal use, the abrasive member 54 will only move from the storage cavity 58, around the roll 30, between the roll 30 and a combined guide and traction roll 66, and then through an opening 68 in the frame 10. The opening 68 has a knife edge 70 for tearing off the used portion of the abrasive member 54.

Since the abrasive surface 56 engages the periphery of the tubing 52, clockwise rotation (FIG. 2) of the frame 10 about the tubing axis moves the abrasive surface against the tubing periphery, abrading the surface of the tubing on both sides of the cut 53. The width of the abrasive member is such that the axial length of the abraded surface on either side of the cut is approximately the depth that the tubing is inserted into a conventional fitting. Rotation of the frame 10 in the opposite direction about the tube 52 will unlock the abrasive member and move the abrasive member about the roll 30, positioning an unused area of the abrasive surface 56 against the tubing.

The device also includes a reaming means 72, including a triangular blade 74, having a transverse shoulder 76, and depending through and slidable along an elongated slot 78 through the bight portion 16, the reaming means 72 being retained in the slot by a retaining pin 80 transversely extending through the blade 74 on the opposite side of the bight portion 16 from the shoulder 76. The blade is insertable into the end of a cut section of tubing 52 to remove burrs from the interior edge of the tubing, the triangular shape of the blade accommodating tubing with various diameters.

The tool also has a liquid reservoir 82 mounted on the frame 10 and having a filling cap 84 and an outlet 86 adjacent the reaming means 72, the outlet being in the form of a plurality of apertures through a reservoir wall. A liquid dispensing means 88, such as a fibrous pad, is mounted on the exterior of the outlet 86 for applying a liquid solder flux from the reservoir 82 to the abraded surface of the cut tubing 52 while the tubing is being reamed. Since the reaming means 72 is slidable toward and away from the dispensing means 88, tubing of variable wall thicknesses can be accommodated.

While the invention is substantially as shown and described, many alterations and modifications of the preferred embodiment of the invention may be performed by those skilled in the art without departing from the spirit or the scope of the invention.

I claim:

1. A combined tubing cutting and cleaning device comprising: a frame; a pair of parallel cradling rolls mounted on the frame; a cutting means; a mounting means for mounting the cutting means on the frame opposite the cradling rolls and for moving the cutting means relative to the cradling rolls to diametrically clamp a section of tubing between the cutting means and cradling rolls, the cutting means cutting the clamped tubing upon relative rotation of the frame and tubing about the tube axis; and an elongated, flexible, relatively thin abrasive member having an abrasive surface on at least one side, said abrasive member being stored in said frame and longitudinally trained around one of said cradling rolls, the thin dimension of the abrasive member extending between said one cradling roll and the clamped tubing with the abrasive surface engaging the periphery of the tubing adjacent the cut to abrade the tubing periphery upon relative rotation of the frame and tubing and locking means mounted on the frame and operably engaging said abrasive member for releasably locking said abrasive member against its associated cradling roll.

2. The invention defined in claim 1 wherein the locking means includes a cam member eccentrically mounted on the frame for rocking about an axis parallel to the cradling roll and spaced from the cradling roll a lesser distance than its largest radius, the abrasive member extending between and engaging the cam member and cradling roll so that movement of the abrasive member in one longitudinal direction rotates the cam member in a direction which decreases the gap between the cam member and cradling roll to clamp the abrasive member, and longitudinal movement of the abrasive member in the opposite direction, rotates the cam member to increase the gap and release the abrasive member.

3. The invention defined in claim 1 and including reaming means mounted on the frame and insertable into the end of a section of tubing to remove material from the end of the tubing upon relative rotation of the tubing and reaming means.

4. The invention defined in claim 1 and including a liquid reservoir mounted on the frame and having an outlet, and dispensing means mounted over said outlet for dispensing liquid from the reservoir.

5. In a tubing cutter of the type having frame, a pair of parallel cradling members mounted on the frame, a cutting means mounted on the frame for movement toward and away from the cradling members to releasably clamp a section of tubing, the cutting means cutting the clamped tubing upon rotation of the frame relative to the tubing about the tubing axis, the combination therewith of an elongated, flexible, relatively thin abrasive member having an abrasive surface, said abrasive member being stored in said frame and longitudinally trained around one of said cradling members, the thin dimension of the abrasive member extending between said one cradling member and a clamped tubing with the abrasive surface engaging the periphery of the tubing adjacent the cut to abrade the tubing periphery upon the relative rotation of the frame and tubing and locking means mounted on the frame and operably engaging said abrasive member for releasably locking said abrasive member against its associated cradling member.

6. A combined tubing cutting and cleaning device comprising: a generally U-shaped frame having first and second opposite leg portions and a bight portion; a pair of parallel cradling rolls mounted on the first leg portion; a rotary cutting means; a mounting means on the second leg portion for rotatably carrying said cutting means opposite from and axially parallel to the cradling rolls and for moving the cutting means toward and away from the cradling rolls to releasably clamp a section of tubing axially parallel to the cradling rolls; the cutting means cutting the clamped tubing upon relative rotation of the frame and tubing about the tubing axis; and an elongated relatively thin, flexible, abrasive member having an abrasive surface on one side, said abrasive member being stored in said frame and trained around a cradling roll between the cradling roll and a clamped section tubing, the abrasive surface engaging the periphery of the clamped tubing adjacent the cut upon said relative rotation of the frame and tubing to abrade said tubing periphery and locking means operably mounted on the first leg portion and engaging said abrasive member to allow movement of the abrasive member in one direction only around the axis of the associated cradling roll and storage means on said frame for storing the abrasive member before it moves around said associated cradling roll.

7. The invention defined in claim 6 and including reaming means mounted on the bight portion of the frame and insertable into the open end of a section of tubing to ream the interior of said tubing end upon relative rotation of the frame and tubing.

8. The invention defined in claim 7 and including a liquid reservoir mounted on the frame and having an outlet adjacent the reaming means and dispensing means mounted on said outlet for applying liquid from the reservoir onto the periphery of a section of tubing adjacent one end during the reaming of said end.

References Cited

UNITED STATES PATENTS

| 426,171 | 4/1890 | Comstock | 30—102 |
|---|---|---|---|
| 565,267 | 8/1896 | Griffin | 30—102 |
| 1,674,440 | 6/1928 | McCloskey | 30—102 |
| 2,271,033 | 1/1942 | Petersen | 30—102 |
| 2,563,483 | 8/1951 | O'Hagan | 30—102 |
| 3,118,227 | 1/1964 | Samuels et al. | 30—102 |

FOREIGN PATENTS 567,949  12/1958  Canada.

WILLIAM FELDMAN, *Primary Examiner.*

R. V. PARKER, JR., *Assistant Examiner.*